Jan. 23, 1962 J. K. OXENHAM 3,018,405

COLOUR TELEVISION TUBE

Filed Aug. 12, 1958

INVENTOR
JOHN KENNETH OXENHAM
BY [signature]
ATTORNEY

United States Patent Office 3,018,405
Patented Jan. 23, 1962

3,018,405

COLOUR TELEVISION TUBE

John Kenneth Oxenham, London, England, assignor to Sylvania-Thorn Colour Television Laboratories Limited, London, England Filed Aug. 12, 1958, Ser. No. 754,583
3 Claims. (Cl. 315—12)

Figure 1:
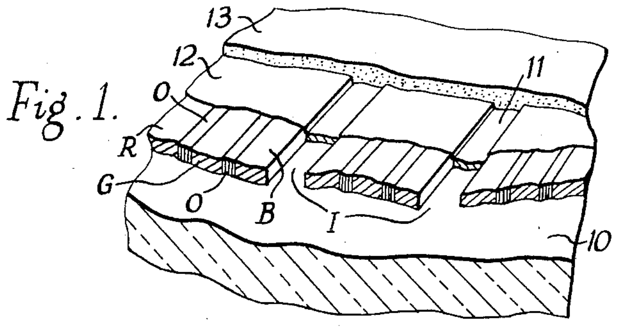

The present invention relates to colour television and is concerned with receiving apparatus of the type employing a cathode ray tube having a viewing screen comprising recurrent groups of parallel or substantially parallel stripes, each group containing a plurality of colour stripes adapted to emit or transmit light of suitable different colours when bombarded by the cathode ray beam and indexing stripes being provided having a secondary electron emission, under bombardment by the cathode ray beam, which differs from that of the remainder of the screen and serves to generate indexing signals. Usually stripes emitting light of three colours, namely red, green and blue, are provided and each group is known as a colour triplet.

In the operation of such apparatus, the cathode ray beam is scanned over the stripes in a direction at least approximately perpendicular to their length and signals representative of the intensities of colours in the picture to be reproduced are gated and applied to control the beam intensity. It is necessary that the gating should be such that the signals representing each colour should be gated to control the beam intensity at the instants when the beam is directed upon stripes of the corresponding colours, and for this purpose the gating is carried out under the control of the indexing signals.

In some forms of screen one index stripe is associated with each colour triplet and in other screens special distribution of index stripes may be used for the purpose of reducing unwanted effects due to cross-modulation of the index signal by the chrominance and luminance signals. The invention is applicable irrespective of which of the aforesaid forms of screen is used.

The construction of viewing screens for apparatus of the type referred to has presented difficulties. One such difficulty is to obtain a sufficient difference between the secondary emission from the indexing stripes and that from the colour stripes. Another is to construct tubes in which the said difference is sufficiently uniform over the screen and in which there is not excessive variation from tube to tube.

In order to reduce these difficulties it has been proposed to construct a viewing screen as follows. A transparent base, which may be the end face of the tube envelope, is coated with a transparent electrically conducting layer, such as stannic oxide, on the side facing the cathode ray tube electron gun. Over this coating are applied phosphor stripes in colour triplets, the stripes of each triplet being separated by an inert (that is a non-light-emitting) stripe, such as unactivated willemite, and the triplets being spaced apart so that between them the conducting layer is exposed. The phosphor stripes and the inert stripes are arranged to be insulating. Over the structure described is then applied a coating of material of high secondary electron emission such as magnesium oxide. The inside of the frusto-conical wall of the cathode ray tube is provided with an electrically conducting coating, for instance of graphite, adapted to collect secondary electrons. The conducting layer on the end face of the tube is connected through a resistor to a source of potential slightly negative with respect to the secondary electron collector and the required indexing signals are generated across this resistor.

In operation, the number of secondary electrons emitted when the cathode ray beam strikes the magnesium oxide will depend upon the potential of the conducting layer on the screen in relation to that of the secondary electron collector, being greater the more negative the conducting layer of the screen is in relation to the collector. Thus, assuming that the secondary electron collector is maintained at a potential suitably positive relatively to the initial potential of the screen, when the cathode ray beam strikes the magnesium oxide lying over a colour triplet, it quickly stabilises at some potential below that of the secondary electron collector, owing to the insulating nature of the triplet. When the potential is stabilised the number of secondary electrons will equal the number of primary electrons (that is the secondary emission ratio is unity), so that no net current flows through the resistor to the screen, and therefore no signal is developed across the resistor. However, when the beam strikes the magnesium oxide layer resting upon the conducting layer such rapid stabilisation does not occur since current can flow to replace the electrons leaving the screen and thus prevent a rise in potential of the screen. In consequence substantial secondary emission takes place and a substantial net current, being the difference between the secondary and primary currents, flows through the resistor to the screen, causing a signal to appear across the resistor.

This known screen structure has the disadvantage that it is difficult to provide a conducting layer, say of stannic oxide, which is sufficiently transparent and at the same time as good a conductor as is desirable. Moreover it is difficult to avoid adversely affecting this layer during the processing of the tube.

The present invention has for its principal object to provide a viewing screen for a cathode ray tube of receiving apparatus of the type specified in which the disadvantage set forth is substantially reduced.

According to the present invention there is provided a method of making a viewing screen for apparatus of the type specified comprising the steps of applying to a transparent base, which may be the end wall of the cathode ray tube, groups of colour stripes of insulating material, spaces being provided between certain of the colour stripes, applying a coating of electrically conducting material over the stripes and spaces, the nature of the coating material and the mode of its application and the nature of the insulating material being such that the spaces are provided with coatings of good electrical conductivity while the coatings over the groups of stripes are discontinuous, and the coatings in the spaces being electrically connected together, and applying over the coating of conducting material a layer of a material having high secondary electron emissivity.

A suitable material for the conducting coating is aluminium which may be applied by evaporation in the same way as in aluminising but without first applying the usual nitro-cellulose or other film. It is found that where the aluminium is evaporated on to the smooth surface of the base, which is usually of glass, a continuous and highly conducting coating is formed, whereas on the rougher surface of the phosphor and willemite stripes the coating is discontinuous and hence substantially non-conducting.

The invention further provides a viewing screen for apparatus of the type specified wherein spaces are provided between certain of the colour stripes, wherein the stripes and spaces are coated with electrically conducting material, the conductivity of the conducting material overlying the stripes being much less than that of the conducting material in the spaces, and upon the coating of conducting material a layer of a material having high secondary electron emissivity.

The known form of cathode ray tube hereinbefore described has the disadvantage that a delay occurs between the beam impinging upon the magnesium oxide where it lies over the conducting layer and the resulting current in the resistor. This delay is due to the transit time of the electrons passing from the screen to the conductive coating on the tube wall and varies over the screen surface because of the different distances of points in the screen surface from the conductive wall coating. Moreover, for the same reason, the current in the resistor for a given beam current will vary from point to point in the screen.

The invention has for a subsidiary object to provide a viewing screen in which this disadvantage is substantially reduced.

According to a subsidiary feature of the invention, therefore, the said coating of electrically conducting material is divided into two mutually insulated parts having portions interleaved with one another.

In a preferred embodiment, alternate conducting stripes are electrically connected together to form one set and the remaining conducting stripes are electrically connected together to form a second set insulated from the first set.

In use, one set of connected conducting stripes is maintained positive with respect to the other (and may, if desired, be electrically connected to a conducting coating on the wall of the tube) aand serves as secondary electron collector for the other set of connected conducting stripes. Since the emitting and collecting stripes are at a uniform spacing over the whole surface of the screen, the secondary emission current is uniform over the whole screen. Moreover, because of the small distance between adjacent conducting stripes the delay referred to is much reduced.

Figure 3:
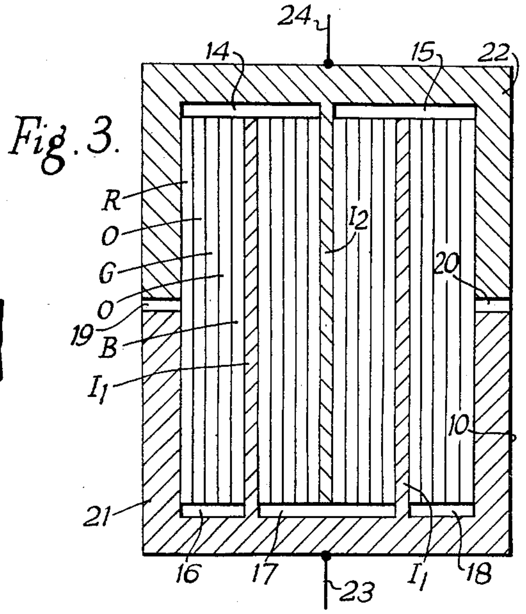
Figure 2:
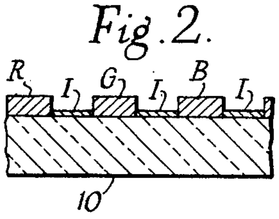
Figure 4:
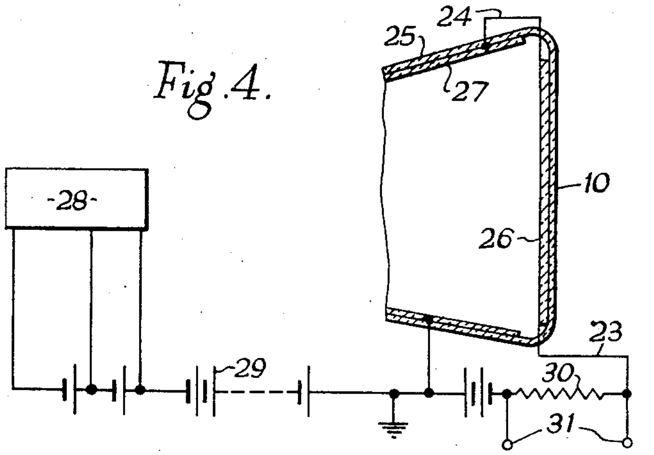

The invention will be described, by way of example, with reference to the accompanying drawings in which:

FIG. 1 is a diagrammatic much enlarged view in perspective of a fragment of a viewing screen according to the invention, FIG. 2 is a much enlarged view in cross-section of a fragment of another screen according to the invention before the secondary electron emitting layer is applied, FIG. 3 is a diagrammatic view in elevation of another screen acccording to the invention before the application of the secondary electron-emitting layer. In this view only four groups of coloured stripes are shown, and these are much magnified in width for the sake of clearness. It will, of course, be appreciated that in a colour television tube a very much larger number of groups of stripes will be needed, and FIG. 4 is a diagrammatic representation of parts of a cathode ray tube according to the invention included in a circuit.

Referring to FIGS. 1 and 2, a transparent base 10, for instance of glass, which may be the end wall of a cathode ray tube has on its surfaces groups of stripes each of three insulating colour phosphor stripes R, G, B giving red, green, blue light emission when bombarded by a cathode ray beam, the stripes R and G and G and B being separated by insulating stripes O giving no light emission under the bombardment. The groups of five stripes are separated by spaces I.

The surface so formed is aluminised, for example by evaporating the metal in a vacuum on to the surface, and it is found that over the smooth surfaces in the spaces I a highly conducting continuous coating 11 is formed, whereas over the rougher surface of the stripes the coating 12 is discontinuous and, therefore, substantially insulating.

The screen is then coated with a layer 13 of material of high secondary electron emissivity, such as magnesium oxide. The conducting stripes 11 are connected together at one end. This coating may be applied by allowing the fumes of burning magnesium ribboh to settle upon the surface to be coated or by evaporating the metal on to the surface in a vacuum, and subsequently oxidising the metal in air or by forming a magnesium oxide slurry which is applied to the surface.

This screen operates in the same way as the known screen hereinbefore referred to but has the advantage over the known form of screen that the conducting stripes I can readily be made of good electrical conductivity without the need for a costly manufacturing process.

The screen illustrated in FIG. 2 is prepared in the same manner as that in FIG. 1. It differs in that in FIG. 2 the number of index stripes I per unit length across the stripes is different from the number of groups of colour stripes per unit length. Thus in FIG. 2 there is one index stripe between each adjacent pair of colour stripes. Other arrangements of index stripes can of course be used. Where for example two groups of index stripes are used, one of the two groups may be in accordance with the present invention and the other not. The coating 13 of secondary electron emitting material is not shown in FIG. 2 but is applied as described with reference to FIG. 1.

In FIG. 3 the screen has stripes R, G, B, O and I arranged as in FIG. 1 and, in addition, is provided with inert phosphor in the regions 14, 15, 16, 17, 18, 19 and 20. When the screen is aluminised a good electrically conducting coating is provided in the spaces $I_1$ and $I_2$ and also around the outside of the stripes over the areas 21 and 22. All these highly conducting areas are shown shaded in order to distinguish them.

The index stripes $I_1$ are connected together at one end and in practice, where there would be a large number of index stripes, the stripes $I_2$ would be connected together at the other end. Because of the non-conducting regions 19 and 20 the areas 21 and 22 are insulated from one another and the conducting parts therefore comprise mutually insulated portions $I_1$ and $I_2$ interleaved with one another. These portions are connected to terminals 23 and 24 respectively.

The way in which the screen of FIG. 3 may be used in a colour television receiver will be described with reference to FIG. 4. In this figure part of the envelope of a cathode ray tube is shown at 25 with the screen of FIG. 3 as its end wall 10 carrying the stripes and layers described and indicated at 26. A part of the envelope near the screen is coated internally with conducting material 27 such as graphite. The electron gun is shown diagrammatically at 28 and the necessary voltages for operating the tube are shown as derived from a battery 29.

One set of conducting member $I_1$ of FIG. 3 is shown as connected by its terminal 24 to the coating 27 and to earth while the other set $I_2$ is connected by terminal 23 through a resistor 30 to a point slightly negative with respect to earth. Index signals can be derived from terminals 31.

In use, when the cathode ray beam from the gun 28 strikes the magnesium oxide lying over the stripes R, G, B or O the number of secondary electrons will equal the number of primary electrons owing to the insulating nature of these stripes. When the beam strikes the magnesium oxide over one of the conducting fingers $I_1$ (FIG. 3) which is of the set at the lower potential, however, there is high secondary emission which is collected by the fingers $I_2$ of the other set. An indexing signal will therefore be obtained across the resistor 30. An indexing signal is generated only from alternate indexing stripes or finger $I_1$ and this is found to be satisfactory in operation.

The conducting grid structure $I_1$ and $I_2$ can readily be made more highly conducting and more stable than the conducting layer of stannic oxide in the known apparatus.

I claim:

1. A viewing screen for a colour television cathode ray tube comprising a transparent base; recurrent groups of parallel stripes on said base, each group including a plurality of colour stripes adapted to provide light of different colours under cathode ray bombardment, adjacent groups being separated by stripe shaped spaces; a first layer of conductive material applied over said groups and said spaces, said first layer providing an electrically conductive coating over each of said spaces and an electrically discontinuous coating over each of said stripes; a second layer applied over said first layer, said second layer consisting of a material of high secondary electron emissivity, first means electrically interconnecting the odd numbered ones of said conductive coatings in said spaces to form one set; and second means electrically interconnecting the even numbered ones of said conductive coatings in said spaces to form another set, the two sets being electrically insulated from each other.

2. A screen as set forth in claim 1 wherein said first and second means comprise coatings of electrically conductive material.

3. A screen as set forth in claim 1 further including means to maintain said sets at different electrical potentials, and an impedance element coupled between said first and second means to be transversed by secondary electron current flowing between said sets.

References Cited in the file of this patent

UNITED STATES PATENTS

| | | |
|---|---|---|
| 2,644,855 | Bradley | July 7, 1953 |
| 2,689,927 | Bradley | Sept. 21, 1954 |
| 2,705,764 | Nicoll | Apr. 5, 1955 |
| 2,730,640 | Koller | Jan. 10, 1956 |
| 2,736,764 | Bingley | Feb. 28, 1956 |
| 2,756,167 | Barnett | July 24, 1956 |
| 2,768,318 | Bradley et al. | Oct. 23, 1956 |
| 2,769,733 | Pool | Nov. 6, 1956 |
| 2,862,999 | Fairhurst | Dec. 2, 1958 |
| 2,916,664 | Sternglass | Dec. 8, 1959 |